(12) United States Patent
Schwartz et al.

(10) Patent No.: US 9,094,684 B2
(45) Date of Patent: Jul. 28, 2015

(54) METHOD FOR DUAL PASS RATE CONTROL VIDEO ENCODING

(75) Inventors: Mayer D. Schwartz, Portland, OR (US); Peter A. Borgwardt, Portland, OR (US); Shiv Saxena, Portland, OR (US); Brenda L. Van Veldhuisen, Portland, OR (US)

(73) Assignee: Google Technology Holdings LLC, Mountain View, CA (US)

(*) Notice: Subject to any disclaimer, the term of this patent is extended or adjusted under 35 U.S.C. 154(b) by 756 days.

(21) Appl. No.: 13/330,137

(22) Filed: Dec. 19, 2011

(65) Prior Publication Data
US 2013/0156098 A1 Jun. 20, 2013

(51) Int. Cl.
| | |
|---|---|
| H04N 7/26 | (2006.01) |
| H04N 7/12 | (2006.01) |
| H04N 11/02 | (2006.01) |
| H04N 11/04 | (2006.01) |
| H04N 19/194 | (2014.01) |
| H04N 19/172 | (2014.01) |
| H04N 19/15 | (2014.01) |
| H04N 19/115 | (2014.01) |
| H04N 19/142 | (2014.01) |
| H04N 19/103 | (2014.01) |

(Continued)

(52) U.S. Cl.
CPC ........... *H04N 19/194* (2014.11); *H04N 19/115* (2014.11); *H04N 19/142* (2014.11); *H04N 19/15* (2014.11); *H04N 19/172* (2014.11); *H04N 19/103* (2014.11); *H04N 19/107* (2014.11); *H04N 19/124* (2014.11); *H04N 19/152* (2014.11); *H04N 19/179* (2014.11)

(58) Field of Classification Search
USPC .......................................................... 375/240
See application file for complete search history.

(56) References Cited

U.S. PATENT DOCUMENTS

| | | | |
|---|---|---|---|
| 4,394,774 A | 7/1983 | Widergren et al. | |
| 5,099,322 A | 3/1992 | Gove | |

(Continued)

FOREIGN PATENT DOCUMENTS

| | | |
|---|---|---|
| EP | 0924933 A1 | 6/1999 |
| WO | 2004004359 A1 | 1/2004 |

(Continued)

OTHER PUBLICATIONS

Patent Cooperation Treaty, International Search Report and Written Opinion of the International Searching Authority for International Application No. PCT/US2012/070258, Jul. 29, 2013, 28 pages.

*Primary Examiner* — Joseph Ustaris
*Assistant Examiner* — Talha Nawaz (57) ABSTRACT

A method of dual-pass rate control video encoding and an encoder are disclosed. Uncompressed input video is received with a video encoder. First pass encoding is performed, and a second pass encoding is performed with the video encoder at a delay relative to the first pass. The first pass encoding detects scene changes within the input video, assigns macroblocks to a pre-determined number of activity classes, and determines a complexity of each picture within the sequence of pictures. Information from the first pass encoding concerning the scene changes, the activity classes, and the complexity are used for rate control determined in second pass encoding for producing and outputting a bit stream of compressed video. During at least one of the first pass and second pass encoding, boundaries of at least some of the GOPs are adjusted to be aligned with the scene changes.

21 Claims, 3 Drawing Sheets

(51) Int. Cl.
*H04N 19/107* (2014.01)
*H04N 19/124* (2014.01)
*H04N 19/152* (2014.01)
*H04N 19/179* (2014.01)

(56) References Cited

U.S. PATENT DOCUMENTS

| | | |
|---|---|---|
| 5,933,450 A | 8/1999 | Ozkan et al. |
| 5,978,029 A | 11/1999 | Boice et al. |
| 6,101,222 A | 8/2000 | Dorricott |
| 6,192,154 B1 | 2/2001 | Rajagopalan et al. |
| 6,252,905 B1 | 6/2001 | Pokrinchak et al. |
| 6,804,301 B2 | 10/2004 | Wu |
| 6,961,376 B2 | 11/2005 | Wu et al. |
| 7,099,389 B1 | 8/2006 | Yu et al. |
| 7,197,072 B1 | 3/2007 | Hsu et al. |
| 7,295,612 B2 | 11/2007 | Haskell et al. |
| 7,302,000 B2 | 11/2007 | Chen |
| 7,453,938 B2 | 11/2008 | Haskell et al. |
| 7,471,726 B2 * | 12/2008 | Srinivasan ............ 375/240.25 |
| 7,609,897 B2 * | 10/2009 | Oneda et al. ................ 382/232 |
| 7,856,059 B2 | 12/2010 | Haskell et al. |
| 8,165,204 B2 * | 4/2012 | Bronstein et al. ........ 375/240.03 |
| 8,325,807 B2 | 12/2012 | Nilsson et al. |
| 2001/0038669 A1 | 11/2001 | Hall et al. |
| 2002/0159523 A1 | 10/2002 | Wang et al. |
| 2004/0151243 A1 * | 8/2004 | Bhaskaran et al. ...... 375/240.03 |
| 2005/0084007 A1 * | 4/2005 | Lightstone et al. ...... 375/240.03 |
| 2006/0045367 A1 | 3/2006 | Chao et al. |
| 2006/0126728 A1 | 6/2006 | Yu et al. |
| 2006/0159166 A1 | 7/2006 | Mohsenian |
| 2008/0130989 A1 | 6/2008 | Moriya et al. |
| 2008/0181256 A1 | 7/2008 | Schwartz et al. |
| 2009/0213938 A1 * | 8/2009 | Lee et al. ................ 375/240.24 |
| 2010/0303148 A1 | 12/2010 | Hiron et al. |
| 2011/0122942 A1 * | 5/2011 | Kudana et al. .......... 375/240.03 |
| 2011/0150074 A1 | 6/2011 | Wang et al. |
| 2011/0150076 A1 | 6/2011 | Wang et al. |
| 2011/0150094 A1 | 6/2011 | Wang |
| 2011/0176562 A1 | 7/2011 | Wang |
| 2011/0176600 A1 | 7/2011 | Wang |
| 2012/0027089 A1 * | 2/2012 | Chien et al. ............ 375/240.15 |
| 2012/0082210 A1 * | 4/2012 | Chien et al. ............ 375/240.02 |
| 2012/0106624 A1 * | 5/2012 | Huang et al. ........... 375/240.02 |
| 2012/0189053 A1 * | 7/2012 | Chen et al. ............. 375/240.12 |
| 2012/0233405 A1 * | 9/2012 | Budagavi ....................... 711/118 |
| 2012/0269275 A1 * | 10/2012 | Hannuksela ............ 375/240.25 |
| 2013/0058405 A1 * | 3/2013 | Zhao et al. ............. 375/240.12 |

FOREIGN PATENT DOCUMENTS

| | | |
|---|---|---|
| WO | 2004105393 A1 | 12/2004 |
| WO | 2006099082 A2 | 9/2006 |
| WO | 2007008355 A2 | 1/2007 |
| WO | 2009045683 A1 | 4/2009 |

* cited by examiner

METHOD FOR DUAL PASS RATE CONTROL VIDEO ENCODING

FIELD

Method and apparatus for dual-pass rate-control video encoding are described.

BACKGROUND

Video images in an information stream can be transmitted to a user via a broadband communication network, for instance, over a satellite, cable, or terrestrial transmission medium. Efficient transmission of video requires compression and formatting techniques to be utilized, for instance, due to bandwidth limitations. Various protocols, such as MPEG protocols, have been designed to maximize bandwidth utilization for video information transmission by adding a temporal component to a spatial compression algorithm.

Each individual image or picture in a sequence of images or pictures of video can be referred to as a frame or field. Each picture or frame is made up of a large number of picture elements (pixels) that define the image. Within each picture or frame, redundant pixels describe like parts of a scene, e.g. a blue sky. Various types of compression algorithms have been used to remove redundant spatial elements thereby decreasing the bandwidth requirements for image transmission. For example, sequences of frames of video may contain pixels that are very similar or identical. Thus, to maximize bandwidth utilization, compression and motion compensation protocols, such as MPEG, can be used to minimize the redundant pixels between adjacent frames.

ITU-T H.264/MPEG-4 part 10 provides an example of an International video coding standard. ITU-T H.264/MPEG-4 part 10 is often referred to as MPEG-4 AVC (Advanced Video Coding). MPEG-4 AVC achieves data compression by utilizing coding tools, such as, spatial and temporal prediction, blocks of variable sizes, multiple references, integer transform blended with quantization operation, and entropy coding. MPEG-4 AVC supports adaptive frame and field coding at picture level and is able to encode pictures at relatively low bit rates yet maintains a desired quality of picture, or video quality.

Rate control is used to dynamically adjust encoding parameters so that the resulting compressed bit rate can meet a target bit rate. Rate control is important to regulate the encoded bit stream to satisfy the channel condition and to enhance the reconstructed video quality. In MPEG digital video systems, the complexity of a video frame or picture is measured by the product of the quantization level used to encode the frame or picture and the number of bits used for coding the frame or picture. This means the complexity of a frame or picture is not known until it has been encoded. As a result, the complexity information always lags behind the actual encoding process, which requires the buffering of a number of frames prior to encoding.

For a constant bit rate (CBR) MPEG video encoder, quantization is used as a means for adjusting the number of bits in a coded picture and buffer management is used as a means for providing a constant bit rate stream under conditions of widely varying number of bits per coded picture while trying to maintain uniform quality in reconstructed (i.e., decoded) video. Thus, issues with respect to scene change, buffer management, and quantizer selection are required to be addressed by the video encoder and its rate control algorithm.

With respect to scene changes, identifying a scene change at a cut and managing an abrupt change in video coding that may occur at a scene change boundary provide challenges and can impact video quality. At a scene change cut, the video quality experienced during the "old" (i.e., previous) scene should not noticeably degrade going into the cut. In addition, the video quality of the new scene immediately following the cut should be the same as the "steady state" video quality for the scene as a whole. The above referenced requirements should be met whether transitioning from an easy to encode (i.e., low complexity) scene to a hard to encode (i.e., high complexity) scene, transitioning from a hard to encode (i.e., high complexity) scene to an easy to encode (i.e., low complexity) scene, or transitioning between comparable scenes (with respect to coding efficiency) that may code significantly different.

With respect to buffer management, coded pictures vary greatly in size, and each video encoding standard must specify a buffer model for constant bit rate output from the encoder. For example, the H.264/MPEG-4 standard requires a coded picture buffer (CPB) of a hypothetical reference decoder (HRD); while, the H.262/MPEG-2 standard requires a video buffer verifier (VBV). A video encoder must never violate the given buffer model. Here, the problem is to balance the need to avoid violating the model and yet still use the fullest possible extent of the buffer to ensure that video quality is maximized for a given bit rate.

With respect to quantizer selection, a video encoder must select an integer quantizer for each and every macroblock in every picture or image. The quantizer provides the primary bit rate control mechanism of the encoder. The higher the quantizer, the lower the number of coded picture bits, and the lower the quantizer, the higher the number of coded picture bits. Rate control algorithms of encoders must provide the ability to derive from a target number of bits for a picture, or a subset of a picture, the quantizer value that will lead the encoder to encode the video to the desired number of bits, or as close as possible to the desired number of bits. However, the range of available quantizers may be small, for instance, limited to 52 values between zero (0) and 51 for the H.264/MPEG-4 standard. Thus, a small change in selected quantizer value can result in a large change in number of bits coded.

The H.264/MPEG-4 standard is designed such that a quantizer value decrease of one (1) should lead to a bit increase of about 12%. However, in practice, the percent change can be quite variable and, when increasing or decreasing the quantizer value by greater than one (1), the percent bit change may not be accurately predicted because the percentages tend not to scale well. Accordingly, the ability to accurately predict the number of bits produced via use of a quantizer value can be difficult. An accurate prediction is a necessary condition for an effective solution to buffer management issues discussed above.

Accordingly, a dual-pass MPEG video encoder and rate control algorithm that are able to address video quality issues at scene changes and provide scene change detection that prevent encoder buffer overflows, yet avoid buffer underflows that might harm video quality, and that can be used for straight constant bit rate (CBR) encoding as well as piece-wise CBR encoding, such as in a statistical multiplexer (stat-mux) system, are needed.

SUMMARY

This disclosure describes a method of dual-pass rate control video encoding. Uncompressed input video is received with an video encoder and includes a sequence of pictures with a plurality of contiguous sequences of pictures each referred to as a Group of Pictures (GOP) that, when coded, begin with an I-picture in display order and end with a last picture before a next I-picture. A first encoding pass of the uncompressed video is performed with the video encoder, and a second encoding pass of the uncompressed video is performed with the video encoder at a delay relative to the first encoding pass. The first encoding pass detects scene changes within the input video, assigns macroblocks to a pre-determined number of activity classes, and determines a complexity of each picture within the sequence of pictures. The term "macroblocks" refers to rectangular arrays of luma samples and two corresponding blocks of chroma samples in the pictures, the term "activity class" refers to different defined classes of macroblocks based on luma values of the pictures of the input video, and the term "complexity" refers to a number of bits generated per picture and activity class. Information from the first encoding pass concerning the scene changes, the activity classes, and the complexity are used for rate control determined in the second encoding pass for producing and outputting a bit stream of compressed video. During at least one of the first encoding pass and the second encoding pass, the boundaries of at least some of the GOPs are adjusted to be aligned with the scene changes.

This disclosure also describes a method of dual-pass rate control video encoding in which uncompressed input video is received with a video encoder and includes a sequence of pictures. The input video includes a plurality of contiguous sequences of pictures each referred to as a Group of Pictures (GOP) that, when coded, begin with an I-picture in display order and end with a last picture before a next I-picture. The GOP also includes picture types encoded as P pictures, B pictures and B-reference pictures. A first encoding pass of the uncompressed video is performed with the video encoder to detect scene changes, to assign macroblocks to a pre-determined number of activity classes, and to determine a complexity of each picture within the sequence of pictures. A second encoding pass for rate control of the uncompressed video with the video encoder is performed at a delay relative to the first encoding pass. Information from the first encoding pass concerning the scene changes, the activity classes, and the complexity are used for rate control determined in the second encoding pass for producing and outputting a bit stream of compressed video. Quantizer values for rate control are determined by the second encoding pass for each macroblock on a per picture type and activity class basis, and during the second encoding pass, each macroblock determined to require a maximum quantizer value by the video encoder is encoded as a skip picture if encoding the macroblock with a maximum quantizer value would cause an overflow of the coded picture buffer (CPB) of the video encoder.

This disclosure also describes a dual-pass rate control video encoder including a first and a second encoder module. The first pass encoder module being configured to receive uncompressed input video including a sequence of pictures having a plurality of contiguous sequences of pictures each referred to as a Group of Pictures (GOP) that, when coded, begin with an I-picture in display order and end with a last picture before a next I-picture. The first pass encoder module is configured to detect scene changes within the input video, assign macroblocks to a pre-determined number of activity classes, and determine a complexity of each picture within the sequence of pictures. The encoder also includes a delay unit for receiving the uncompressed input video. The second pass encoder module receives the uncompressed input video via the delay unit and is configured to obtain information from the first pass encoder module concerning the scene changes, the activity classes, and the complexity used to determine rate control of the uncompressed video and to produce and output a bit stream of compressed video. At least one of the first pass encoder module and the second pass encoder module is configured to adjust the boundaries of at least some of the GOPs to be aligned with the scene changes.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Figure 1:
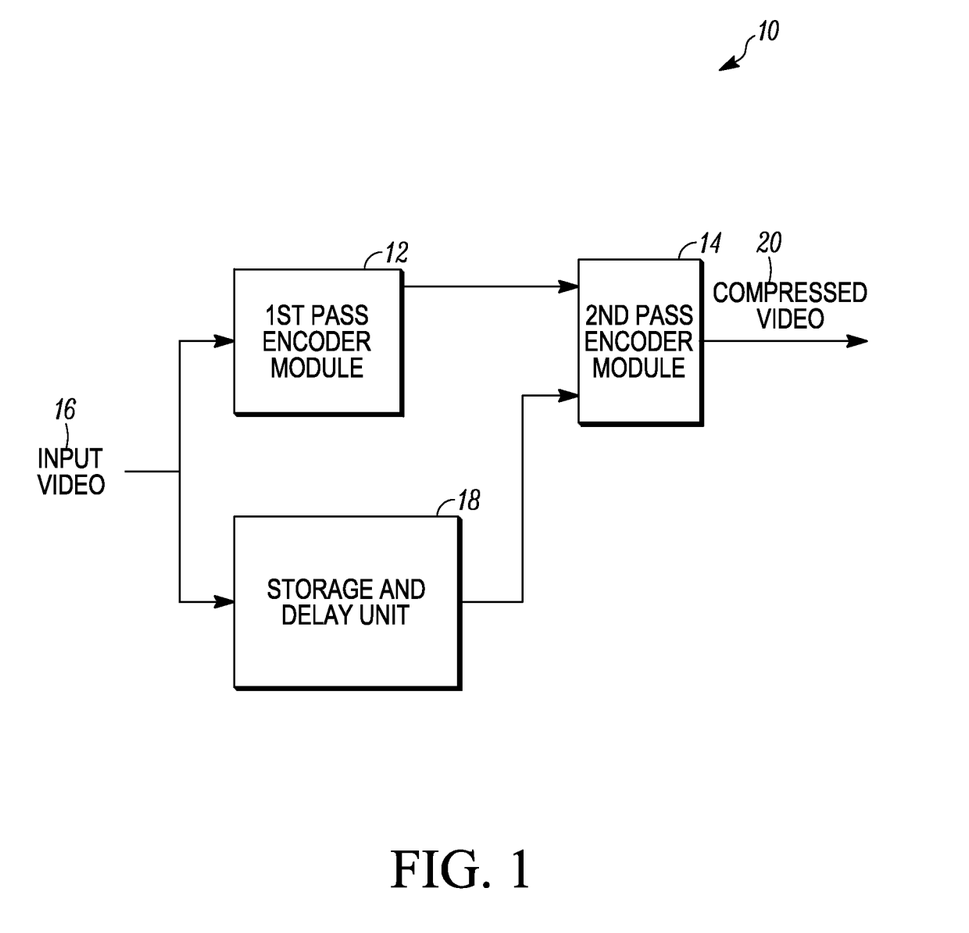
FIG. 1 illustrates a block diagram of a two-pass encoder according to an embodiment.
Figure 3:
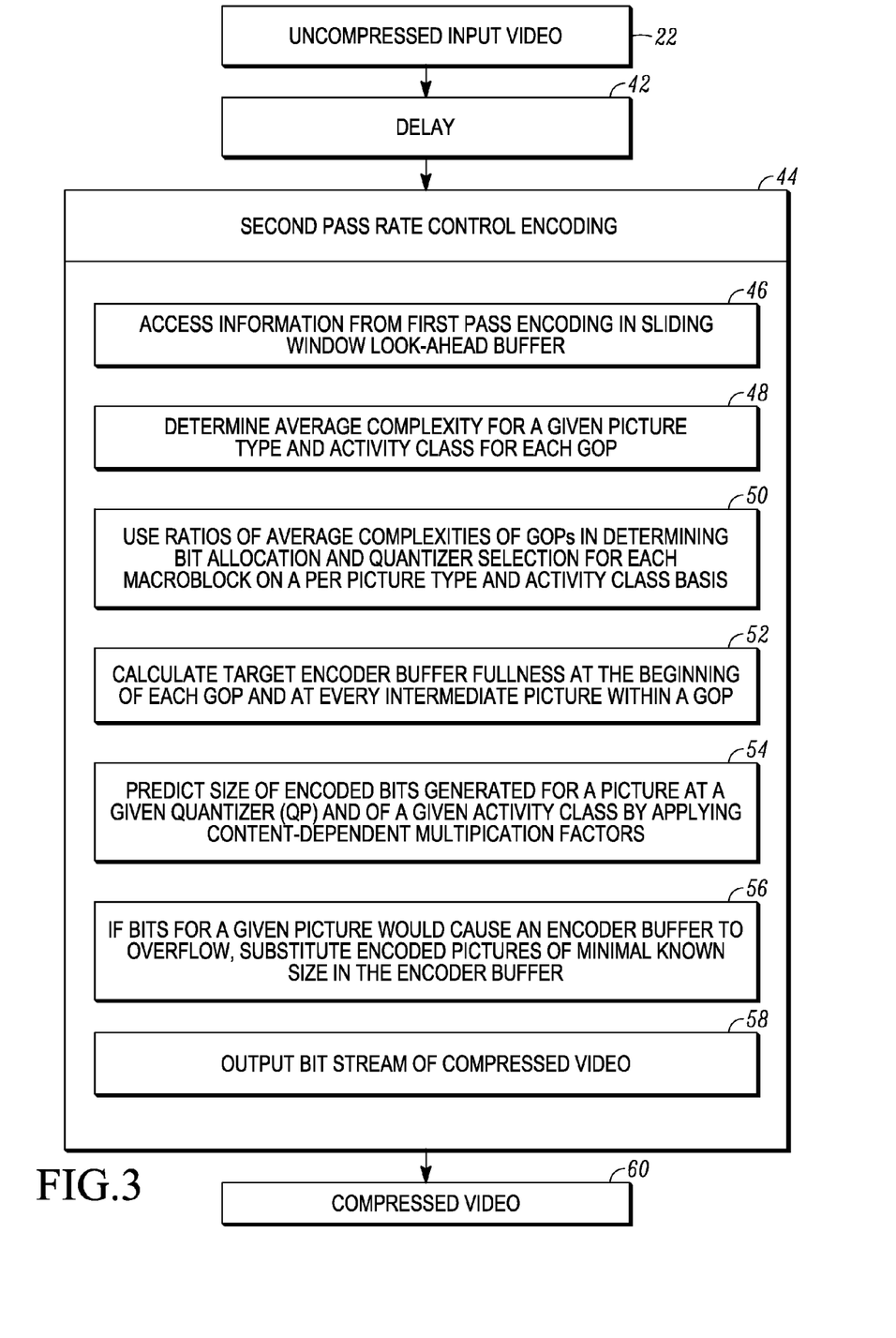
FIG. 3 is a flowchart with respect to process steps performed during a second encoding pass according to an embodiment.

FIG. 1 illustrates a block diagram of a two-pass MPEG encoder 10 having a first pass encoder module 12 and a second pass encoder module 14 receiving the same input video sequence 16. The input video sequence 16 passes through a storage and delay unit 18 before being input into the second pass encoder module 14 to provide a delay between first encoding pass in the first pass encoder module 12 and second encoding pass in the second pass encoder module 14. Also, see steps 22 and 42 in FIG. 3. According to the embodiment of a dual pass encoder 10 discussed herein, the first encoding pass is performed at a variable bit rate (VBR) while the second pass encoding can produce and output compressed video 20, for instance, at a predetermined constant bit rate (CBR). Also, see step 60 in FIG. 3. The encoder 10 can be a CBR encoder, or alternatively, a statistical multiplexer (statmux) encoder.

The two-pass encoder 10 may be a MPEG-4 AVC encoder and may include hardware, such as, a processor or other circuit used for encoding. It should be understood that the two-pass MPEG-4 AVC encoder may include additional components and that some of the components described herein may be removed and/or modified without departing from a scope of the two-pass MPEG-4 AVC encoder 10. Also, although the two-pass encoder 10 is primarily described with respect to MPEG-4 AVC, it should be apparent that embodiments of the invention may be used with different video coding standards, such as MPEG-2.

In FIG. 1, the first encoding pass and the second encoding pass are performed approximately in parallel with an offset provided by the delay unit 18. The results obtained by the first recording pass are used in the second encoding pass. The first encoding pass may be performed ahead of the second encoding pass by an approximately constant number of pictures, for example, about 30 pictures. The delay may also be measured in time, for instance, a 1 second delay. Because the first encoding pass is ahead of the second encoding pass, the first encoding pass is able to provide information for use in the second encoding pass before the second pass encoder module 14 begins to process the video pictures.

With respect to video coding in general, pictures or frames referenced by a MPEG video encoder for the purpose of predicting motion of images within adjacent picture or frames are called anchor pictures or frames. For purposes of this disclosure, the word "picture" refers to a field or a frame. The term "intra prediction" refers to a prediction derived from decoded samples within the same or current decoded picture, the term "inter prediction" refers to a prediction derived from decoded samples of reference pictures other than the same or current decoded picture, and the term "reference picture" refers to a picture containing samples that may be used for inter prediction of subsequent pictures in decoding order. The term "macroblock" refers to a rectangular array of luma samples and two corresponding blocks of chroma samples.

The anchor frames or pictures may include the following types of pictures: I-pictures, P-pictures, B-pictures, and B-reference pictures. An I-picture is a picture or groups of pixels (macroblocks) that are decoded using intra-prediction techniques only. In contrast, a P-picture is a picture that may be decoded using either intra-prediction or inter-prediction with at most one motion vector and reference to predict samples values of each block. Thus, a P-picture can contain references to previously encoded pictures within a sequence of pictures. A B-picture is a picture that may be decoded using either intra prediction or inter-prediction with at most two motion vectors (i.e., bi-directional) and references to predict samples values of each block. B-pictures can contain macroblocks referred from previously encountered frames and macroblocks from frames that follow the frame being currently analyzed, and B-pictures can entail a type of lookahead scheme to describe the currently analyzed image in terms of an upcoming image. A B-reference picture is a picture that is both a B-picture and a reference picture.

Both B-picture and P-picture encoding reduce duplication of pixels by calculating motion vectors associated with macroblocks in a reference frame or picture, resulting in reduced bandwidth requirements. The choice of encoding type for a particular frame or picture is typically dependent upon the complexity of the particular image.

With the above definitions in mind, a contiguous sequence of coded pictures in decode order that begins with an I-picture and ends with the last picture just before the next I-picture is referred to as a Group of Pictures (GOP). A sub-GOP is a contiguous sequence of coded pictures in display order starting with an I-picture or a P-picture and ending with the last picture just before the next I-picture or P-picture. For purposes of example, a picture-type sequence may be: IBBPBBPBBI. Here, the GOP structure is represented as "IBBPBBPBB" which includes the following sub-GOPs: "IBB", "PBB", and "PBB".

The rate control algorithm discussed herein and used by the encoder 10 is GOP based. All key parameters are calculated on a GOP-by-GOP basis and are subject to change at GOP boundaries.

In the GOP based embodiment of rate control algorithm discussed herein, scene changes are aligned with GOP boundaries. (See step 36 in FIG. 2.) Video quality at scene changes (cuts) of an old scene should not noticeably degrade going into a cut, and video quality of a new scene immediately following the cut should be the same as the stead-state video quality of the scene as a whole. In other words, there should be no "easing-in" to the new scene; rather, the new scene should have the correct video quality from the outset. Thus, for every scene change detectable by the encoder 10, the sub-GOP containing the first picture of a new scene and the exact picture at which the new scene starts is determined by the first pass encoder 12. (See steps 32 and 34 in FIG. 2.) For any scene-change sub-GOP that starts with a P-picture, the rate control algorithm replaces the P-picture with an I-picture. (See step 36 in FIG. 2) As a result, a new GOP will start near every scene change. Since scenes may be coded very differently by encoder 10, accurate detection of the scene change cuts as discussed above permits high overall video quality to be achieved in the video coding process.

In the dual pass encoder 10, every picture of a given type (I, P, B, reference B) is coded with a constant quantizer in the first pass for all macroblocks of that picture type for purposes of providing a uniform metric across all scenes. (See step 24 in FIG. 2). The term "quantizer" refers to the variable (i.e. quantization parameter (QP)) used in a video coding process to scale transform coefficients. The larger the quantizer, the smaller are the absolute values of the scaled coefficients and hence the number of bits generated for a given macroblock. The quantizer selected for each macroblock is the primary means by which second pass encoding controls bits generated (output) by the encoder; however, in first pass encoding by encoder 10, a constant quantizer is used for all macroblocks of a given picture type.

The first encoding pass 24 of encoder 10 is used for purposes of scene-change detection using macroblock activity values (see step 30 in FIG. 2), discussed in greater detail below, so that GOP boundaries near scene changes can be adjusted as discussed above. The first encoding pass 24 of encoder 10 is also used for purposes of data collection so that a model of complexity can be built (see step 28 in FIG. 2) and made available for use during second pass encoding (see step 46 in FIG. 3). The term "complexity" refers to the generated bits per picture and activity class which are determined during first pass encoding, and the term "activity class" defines different classes of macroblocks based on original input luma values.

Complexity is calculated in the first encoding pass of encoder 10 on a per picture basis and is stored in a sliding window used by second pass encoding of encoder 10. (See step 40 in FIG. 2). Thus, first pass encoding 24 of encoder 10 may be used to generate the following data on a per picture basis: picture type; scene change flag; header bits; generated bits per activity class; number of macroblocks per activity class, and average macroblock activity per activity class. (See step 38 in FIG. 2.) With respect to activity classes, there are a pre-determined number (M) of activity classes (k), and every macroblock in every picture has a well-defined activity which is categorized according to its activity class (k). The activity calculation is based on the original input picture from input video (see step 22 in FIG. 2).

Thus, in the first pass encoding 24 provided by first pass encoder 12, a sufficient amount of data is collected so that complexity metrics can be calculated for use during second pass rate control encoding (see step 44 in FIG. 3) provided by second pass encoder module 14. The average complexity for a given picture type and activity class is calculated across every GOP to provide a clean separation between scenes (see step 48 in FIG. 3) and permits each scene to be coded in second pass encoding 44 in the most appropriate manner and with uniform video quality across the GOP, and hence the scene. Accordingly, ratios between the average complexity values are used for the calculation of bit allocation and quantizer selection in second pass encoding 44 of encoder 10. (See step 50 in FIG. 3.)

The target encoder buffer fullness at the beginning of each GOP and at every intermediate picture within a GOP is calculated by the encoder 10. (See step 52 in FIG. 3.) This permits the rate control algorithm to drive the encoder buffer to the correct beginning value at the start of every GOP. Encoder buffer fullness is treated differently for different types of scenes by encoder 10. For example, at the beginning of a scene with little motion the encoder buffer is set to a low value so that a large I-picture can begin the GOP with the other pictures within the GOP being proportionately much smaller. Compliance with the buffer model of any given standard is guaranteed by construction and thus, there can be no buffer overflow. This is ensured by substituting minimal encoded pictures of known size after encoding, but before delivery of the final bit stream, if the final bit stream would cause the buffer to overflow. (See step 58 in FIG. 3.)

For some content, the prediction of encoded bits generated for a given quantizer may not be very accurate. Thus, a multiplier (to target bits) to adjust for failure of accurate bit prediction is used during second pass encoding by encoder 10. (See step 54 in FIG. 3.) This ensures that the buffer is used effectively by more accurately meeting target buffer fullness at every picture and that target coded picture bits for a given quantizer and activity class can be accurately predicted for purposes of improving accuracy in coded bit prediction and quantizer selection. The use of content-dependent multiplication factors derived from a set of estimation filters provides a mechanism for adjusting for inaccuracies in quantizer model.

With the above general description in mind, the procedures performed in each of first and second pass encoding, 24 and 44, of encoder 10 is discussed below in detail.

First Pass Encoding

There are three main responsibilities for the first pass 24 performed by the first pass encoder module 12 of the dual pass encoder 10: (i) identify scene change 30; (ii) adjust GOP boundaries 36; and (iii) generate data 38 for use by the second pass encoder module 14 during second pass encoding 44.

First pass encoding 24 of encoder 10 obtains as much information as possible and feeds the information to the look-ahead picture buffer 40 of the second pass encoder module 14. With this information, the frame or picture at which a scene change occurs and the sub-GOP are pre-identified in the look-ahead picture buffer of the second pass encoder module 14. For this purpose and as described above, a nominal P-picture of a sub-GOP is promoted to an I-picture (if not already an I-picture in the sub-GOP) in the look-ahead picture buffer of second pass encoder 14. See step 36 in FIG. 2. Then, a clear distinction as to which frames belong to the old or previous scene and which frames belong to the new scene at a scene-change sub-GOP is provided to the second pass encoder module 14. While there is typically a nominal GOP size and cadence, a scene change will typically cause a GOP re-alignment.

The bits in each coded picture can be divided into residual bits and non-residual bits. The non-residual bits include motion vectors as well as macroblock types. Rate control only controls or selects the quantizer used for each macroblock. Macroblocks are classified into activity classes (k) based on original input luma values. Quantizers (QP) are calculated by the second pass encoder 14 on a per activity class basis. See step 50 in FIG. 3. Only the residual bits are changed by changing the quantizer, the non-residual bits are unaffected by quantizer change.

For purposes of obtaining consistent, accurate information within scenes and at scene changes, the first encoding pass 24 is run with a constant quantizer (QP) for all macroblocks in all activity classes. Only picture bit counts are used because the picture bit counts are consistently accurate. Traditionally, non-residual bit count estimates have been inconsistent and varied and thus are not used. Accordingly, first pass encoding 24 by encoder 10 handles all of the pictures of the input video 16 in a uniform, consistent manner.

The first pass encoding 24 of the first pass encoder module 12 is optimized as a data collector and scene detector and does not have the objective of providing single-pass encoding with any type of rate control. Rather, the first pass is responsible for scene detection 30, for adjusting GOP boundaries 34, and for building a model of the complexity 28 of the input video 22 for use during second pass encoding 44.

The length (N) of a GOP can be stated as follows: $N=n_I + n_P + n_{B\text{-}ref} + n_B$, where m is the number of I-pictures in the GOP (typically one), $n_P$ is the number of P-pictures in a GOP, $n_{B\text{-}ref}$ is the number reference B-pictures in a GOP, and $n_B$ is the number of non-reference B-pictures in a GOP. The number of P-pictures can be further refined as $N_P = n_{Ip} + n_p$ where $n_{Ip}$ is zero for progressive count and is equal to $N_I$ for interlaced content. The subscript "Ip" is used to denote the P-picture immediately following an I-picture in an interlaced frame coded as an I-field followed by a P-field. Because of scene changes, the length (N) of GOPs will not always be the same nominal value and can vary from GOP to GOP.

First pass encoding 24 of encoder 10 places the complexities for all coded pictures into a sliding window look-ahead buffer 40. Since the first pass is run with a constant quantizer over all pictures (for instance, with a QP equal to 30 for all but I-pictures which are encoded with a quantizer of 28), the number of actual bits generated for each picture suffices as the complexity for that picture. Header bits, which include sequence parameter set, picture parameter set, SEI, and access unit delimiter NAL units, are not included in the picture complexities. The complexity (total picture bits excluding header bits) for a picture (i) is denoted as $c_i$, the header bits are denoted as u and the picture type (I, P, B-ref, or B) are denoted as $\tau_i$.

Figure 2:
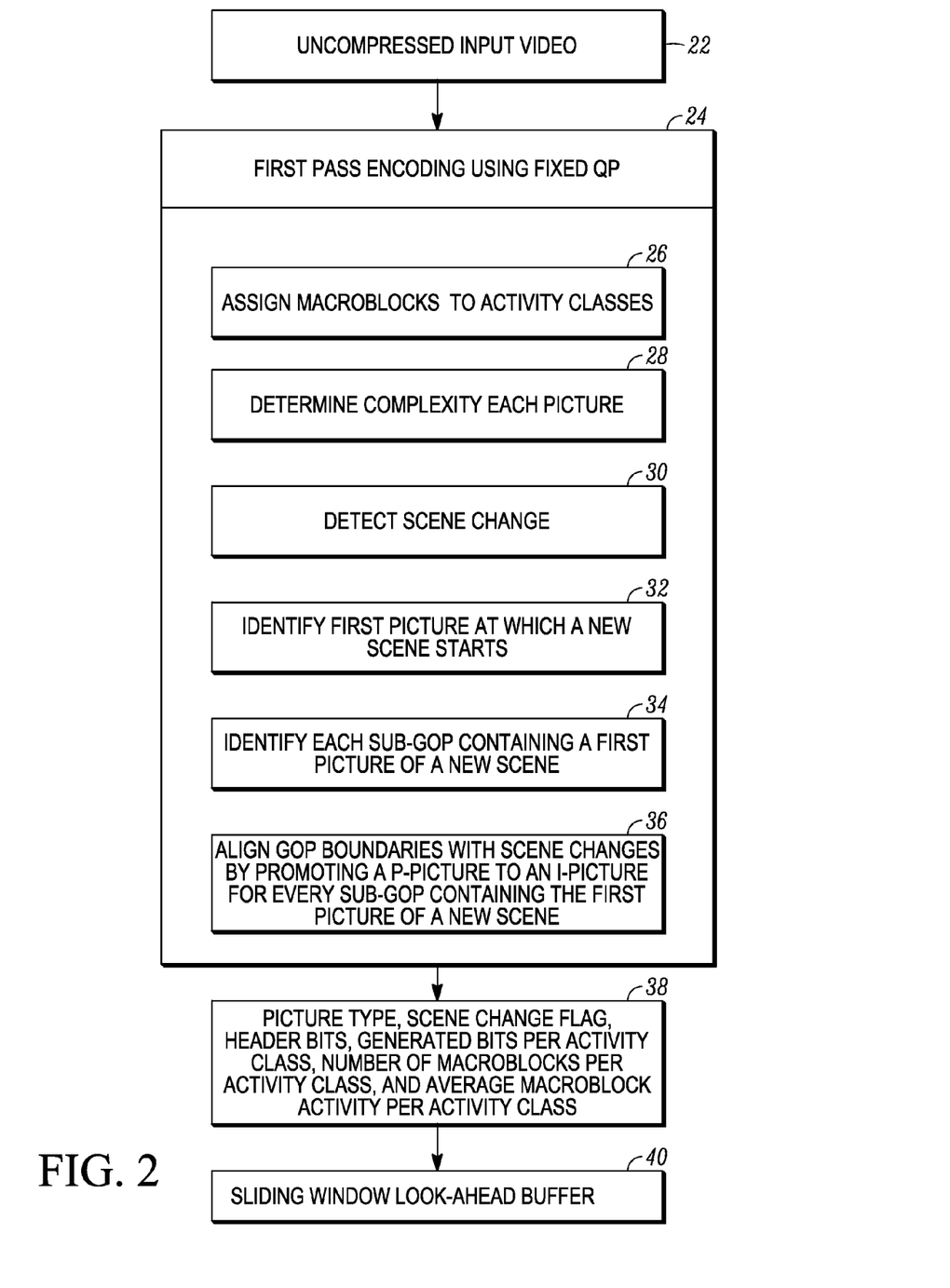
FIG. 2 is a flowchart with respect to process steps performed during a first encoding pass according to an embodiment.

The macroblocks of the original (input) pictures are categorized according to their spatial activity (see step 26 in FIG. 2) during first pass encoding 24. The spatial activity metric (S) for a macroblock is provided in the functional form: $S: L \rightarrow m$; where L is a 16×16 array of luma values from the macroblock, and m≥0. For any picture (i), $mb_{ij}$ denotes the jth macroblock in normal scan order (i.e., left to right, top to bottom), and $Y_{ij}$ denotes the 16×16 array of luma values. Based on spatial activity, macroblocks are classified into M number of activity classes (k) numbered from 0 to M−1. The activity classes (k) are based on the given M−1 thresholds, $h_1, \ldots, h_{M-1}$, where $h_0 = 0$ and $h_M = \infty$ and where $h_0 < h_1 < \ldots < h_{M-1} < h_M$. By definition, $mb_{ij}$ is in activity class k, denoted by $A(mb_{ij}) = k$, if and only if $h_k \leq S(Y_{ij}) < h_{k+1}$. The number of macroblocks in a given picture (i) in a given activity class (k) is then denoted by:

$$mb\_count_i^{(k)} = |\{j : A(mb_{ij}) = k\}|.$$

The total number of macroblocks for any given picture in a sequence is a constant mb_count so that $\forall i$: $mb\_count = \sum_{k=0}^{M-1} mb\_count_i^{(k)}$. For a given activity class k and picture (i), the average macroblock activity is denoted by $$\overline{a}_i^{(k)} = \frac{\sum_{j \ni A(mb_{ij})=k} S(Y_{ij})}{\text{mb\_count}_i^{(k)}}.$$

These per activity class average macroblock activities are generated by the Ambarella HW used in first pass encoding 24. The picture level average macroblock activity (across all activity classes) is used in identifying scene change. For a given picture (i), it is defined as:

$$\overline{a}_i = \sum \frac{\text{mb\_count}_i^{(k)} \cdot \overline{a}_i^{(k)}}{\text{mb\_count}}.$$

Scene change detection 30 in the first pass encoding 24 is based on average macroblock activity of a set of prior pictures compared with the average macroblock activity of a set of current/next pictures in display order. Because of the possibility of memory limitations, there may be restrictions on the number of pictures used to determine a scene change. For frame based encoding, let N represent frames indexed by display order (rather than encode order). If the current frame (picture) is $X_{j0}$, then the prior pictures are the set of pictures: $P=\{X_{j0-6}, X_{j0-5}, X_{j0-4}, X_{j0-3}, X_{j0-2}, X_{j0-1}\}$ unless P contains a scene change, in which case, the set of prior pictures is the maximal subset of P not including another scene by including the frame. The set of current/next pictures is the set of $\{X_{j0}, X_{j0+1}\}$. For field coded pictures, let $X_{j,1}$ and $X_{j,2}$ represent the first and second fields respectively for frame X (in display order). If the current frame is field-coded as $\{X_{j0,1}, X_{j0,2}\}$ then the prior pictures are the set of pictures: $P=\{X_{j0-3,1}, X_{j0-3,2}, X_{j0-2,1}, X_{j0-2,2}, X_{j0-1,1}\}$ unless P contains a scene change in which case the set of prior pictures is the maximal subset of P not including another scene but including the field $X_{j0-1,1}$. Only five fields are used because there are cases where a scene change occurs between two fields in the same frame. The set of current/next pictures is the set $\{X_{j0,1}, X_{j0,2}, X_{j+1,1}, X_{j0+1,2}\}$.

Given a set of pictures $\{X_{j0}, X_{j1}, \ldots, X_{jm}\}$ with matching picture level average macroblock activities $P=\{\overline{a}_{j_0}, \overline{a}_{j_1}, \ldots, \overline{a}_{j_m}\}$, and a set of current/next pictures $\{X_{k0}, X_{k1}, \ldots, X_{kn}\}$ with matching picture level average macroblock activities $N=\{\overline{a}_{k_0}, \overline{a}_{k_1}, \ldots, \overline{a}_{k_n}\}$, a scene change threshold, t>0, is defined as follows. A scene change is declared if either of the following conditions is met:

$(\min N) - (\max P) \geq t,$ or (1)

$(\min P) - (\max N) \geq t.$ (2)

There is also an additional scene change detection mechanism based on comparing the complexity of the current P picture with the complexity of the previous P picture. For any two pictures i and j where j<i, $\tau_i = \tau_j = P$, and there does not exist a k such that j≤k<i with $\tau_k = P$, a scene change is declared at picture (i) if the function $sc(c_i, c_j)$ returns "True". This function is defined as:

$$sc(c_i, c_j) = \begin{cases} c_i < c_j \rightarrow \text{False} \\ (c_i \geq c_j) \wedge (c_j < 5000) \rightarrow c_i > c_j + 50000 \\ (c_i \geq c_j) \wedge \left(250000 > c_j \geq 5000 \rightarrow c_i > \left(5 - \frac{3c_j}{250000}\right) \cdot c_j\right) \\ c_i \geq c_j) \wedge (250000 \leq c_j) \rightarrow c_i > 2c_j. \end{cases}$$

This additional scene change detection is a secondary mechanism and is only invoked if the primary mechanism does not declare a scene change. The secondary mechanism as defined may typically only detect a scene change from easy-to-hard to encode scene changes.

Adjusting GOP boundaries at scene change is accomplished by promoting the P-picture in a scene-change sub-GOP to an I-picture (if there is not already an I-picture). See step 36 in FIG. 2. Normally, I-pictures will be inserted at a scene change; however, in some cases, where there are back-to-back sub-GOPs with I-pictures, the earlier I-picture will be demoted to a P-picture. However, at all times any picture type promotion and/or demotion is subject to the constraint that a GOP can be lengthened by at most one sub-GOP, i.e., any GOP-length cannot exceed "normal cadence" GOP-length plus the size of one sub-GOP. In the simple case where there is a scene change sub-GOP immediately following a normal cadence I-picture sub-GOP, the I-picture is demoted to a P-picture. In a series of back-to-back scene change sub-GOPs, only in the last sub-GOP is the P-picture promoted to an I-picture, except that other scene-change sub-GOPs may have P promotion in order to maintain the GOP length constraint.

With the above description of the first pass in mind, the data generated by the first pass for use during the second pass includes the following per picture items (see step 38 in FIG. 2):

Scene change flag;
Picture type (τ);
Header bits (u);
Generated bits per activity class, ($c^{(k)}$);
Average macroblock activity per activity class ($\overline{a}_i^{(k)}$); and
Number of macroblocks per activity class (mb_count$_i^{(k)}$).

Second Pass Encoding

Based on the information provided by the first pass (see step 46 in FIG. 3), the rate control provided by the second pass encoding 44 of the second pass encoder module 14 can instantaneously and correctly set the quantizer (QP) at the beginning of each new scene. For example, at a hard-to-easy scene change transition, where the hard scene may use an average I quantizer of about 50 and the easy scene may use an average I quantizer of about 25, the I-picture quantizer at the beginning of an easy scene can be set to 25 and no overflow of the encoder buffer can be assured despite the use of a small quantizer setting. Also, a high quantizer setting for a hard scene will be implemented at the beginning of the hard scene, thus an underflow of the buffer should not be experienced during the second pass.

Video quality at scene change is ensured based on handling of scene change sub-GOPs. The first pass identifies which pictures are part of the old scene and which are part of a new scene within a sub-GOP. See steps 32 and 24 of FIG. 2. Thus, within a scene change sub-GOP, there can be radical change in quantizer values implemented by the second pass encoding 44.

The complexities (bits) for a given picture are distributed across the number (M) of activity classes (k). The notation $c_i^{(k)}$ is used for the bits in a picture attributed to the macroblocks in activity class (k). Thus, $$c_i = \sum_{k=0}^{M-1} c_i^{(k)}$$

Within a given GOP, the average complexity for a given picture type and activity class can be determined. See step 48 in FIG. 3. If there is insufficient space in the look-ahead buffer to accurately calculate the average complexities, the best approximation based on pictures seen so far is used. These averages are denoted $\bar{c}_I^{(k)}$, $\bar{c}_P^{(k)}$, $\bar{c}_{B-ref}^{(k)}$, and $\bar{c}_B^{(k)}$ respectively for I, B-ref, and B pictures for a given activity class (k). Similarly, the header bit averages within a GOP are denoted by $\bar{u}_I$, $\bar{u}_P$, $\bar{u}_{B-ref}$, and $\bar{u}_B$. The header bits are not associated with any particular macroblock and hence are not associated with any particular activity class.

A weight is associated with each picture type and activity class in a given GOP. The weights are normalized so that the weight for a P-picture is always 1. For the H.264/MPEG-4 standard, each decrease in quantizer (QP) by 1 approximately results in an increase in number of bits by $2^{1/\lambda}$ where $\lambda=6$. An offset between −2 and −6 in the average quantizer for an I-picture from the average quantizer for a P-picture in the same GOP has been found to provide more uniform visual results in most cases. Similarly, offsets between +2 and 0 for a reference B-picture and between +4 and 0 for a B picture (from a P-picture) provide more uniform visual results. In some cases, an offset less than −6 for an I-picture or greater than 4 for a B-picture (or 2 for a reference B-picture) can be used. This leads to tuning parameters $\delta q_I$, $\delta q_B$ and $\delta q_{B-ref}$ for these respective offsets. For example, these can be set to $\delta q_I$=10, $\delta q_B$=−10, and $\delta q_{B-ref}$=−10. Thus, using the "Clip3" function in the H.264/MPEG-4 standard, leads to the following set of values for picture weights for a given activity class (k) where $0 \leq k < M$:

$w_I^{(k)} = \text{Clip3}(2^{2/\lambda}, 2^{\delta q_I/\lambda}, \bar{c}_I^{(k)}/\bar{c}_P^{(k)})$, $w_P^{(k)} = 1$, $w_{B-ref}^{(k)} = \text{Clip3}(2^{\delta q_{B-ref}/\lambda}, 2^0, \bar{c}_{B-ref}^{(k)}/\bar{c}_P^{(k)})$, and $w_B^{(k)} = \text{Clip3}(2^{\delta q_B/\lambda}, w_{B-ref}^{(k)}, \bar{c}_B^{(k)}/\bar{c}_P^{(k)})$.

The weighted sum of the complexities per activity class is denoted by $C^{(k)} = n_I \cdot w_I^{(k)} \cdot \bar{c}_I^{(k)} + n_P \cdot w_P^{(k)} \cdot \bar{c}_P^{(k)} + n_{B-ref} \cdot w_{B-ref}^{(k)} \cdot \bar{c}_{B-ref}^{(k)} + n_B \cdot w_B^{(k)} \cdot \bar{c}_B^{(k)}$.

The total weighted sum across all activity classes is denoted by $$C = \sum_{k=0}^{M-1} C^{(k)}.$$

The motivation for the above equations is as follows. Second pass encoding receives information from First pass encoding with respect to how predictable a current scene may be, more specifically, how well a P picture may be estimated from the associated reference P/I picture and how well the B/Bref can be estimated from the P pictures. From this information, second pass encoding determines how to weight the different picture types. For example, the more predictable the content of the current scene may be, the wider the spread in the weights. Alternatively, if the content within the current scene is not very predictable, the weights converge to a value near 1. However, as the content becomes very predictable, then the weights will spread. Thus, if the video is near still content, then a lot of bits (low QP) will be required to encode the I picture because the rest of the pictures, P/B/Bref, estimate very well and will not require many bits to encode. However, if the P picture cannot be estimated well from the I picture, the content in the P picture will require significant recoding. In this case, it would be a waste to code the I picture at a significantly lower QP and it would actually cause a beat or flicker when the I picture was decode and displayed in the decoded video.

The total number of header bits within a GOP is denoted by:

$U = (n_I \cdot \bar{u}_I) + (n_P \cdot \bar{u}_P) + (n_{B-ref} \cdot \bar{u}_{B-ref}) + (n_B \cdot \bar{u}_B)$ The size of the coded picture buffer (CPB) is denoted as V; the buffer fullness before encoding a picture is denoted as bf and the desired buffer fullness after encoding the picture is bf'. In an ideal world, $bf_{i+1}$=bf'. Let picture_bits$_i$=bit_rate$_i$/ frame_rate be the average target number of bits for a given picture. For the constant bit rate (CBR) case, every picture has the same average number of target bits; in a stat-mux case, bit_rate$_i$ will vary from frame to frame. The index for a first picture in a GOP is denoted as $i_0$, and the index of the first picture in the next GOP by $i_1 = i_0 + N$. Thus, for a given GOP, the total target bits is denoted by $$\text{lookahead\_bits} = \sum_{i=i_0}^{i_0+N-1} \text{picture\_bits}_i.$$

These lookahead bits must be allocated to the different activity classes. A fraction γ of the lookahead bits is allocated to be proportional to the per activity class complexities and the remaining bits to be proportional to the number of macroblocks in a given activity class. The number of lookahead bits in a given GOP allocated to activity class (k) is thus denoted by $$\text{lookahead\_bits}^{(k)} = \left(\gamma \cdot \frac{C^{(k)}}{C} + (1-\gamma) \cdot \frac{\text{mb\_count}^{(k)}}{\text{mb\_count}}\right) \cdot (\text{lookahead\_bits} - U).$$

It can then be shown that $\Sigma_{k=0}^{M-1} \text{lookahead\_bits}^{(k)} = \text{lookahead\_bits} - U$. The fraction γ can be varied between 0.43 and 0.69 based on $w_I^{(k)}$. A weighting for the mb_count$^{(k)}$ (not reflected in the above equation) is also used to give more bits to the lower activity areas. As an example, this weighting may be set at 1.1, 1.05, 0.98, and 078 for M=4.

For frame encoding, an initial target number of bits for the I picture at the beginning of the next GOP is $$t_{i_1} = \sum_{k=0}^{M-1} \left(w_I^{(k)} \cdot \bar{c}_I^{(k)} \cdot \text{lookahead\_bits}^{(k)} / C^{(k)}\right).$$

For field-encoding, the second field in the frame at the beginning of a GOP is coded as a P-field. If this field has a complexity greater than the average P-picture in the GOP then it needs to be considered along with the I-field according to the multiplier α where $$\alpha = \begin{cases} 2 & \text{if } c_{i_1+1} > 1.3 \cdot \overline{c}_P \\ 1 & \text{otherwise.} \end{cases}$$

The desired buffer fullness before the beginning I picture in the next GOP (which is equal to the desired buffer fullness after the last picture in the GOP is encoded) is then $$bf'_{i_1-1} = \begin{cases} V/10, & \text{if } \alpha \cdot t_{i_1} > 0.8 \cdot V \\ (V - \alpha \cdot t_{i_1})/2 & \text{otherwise.} \end{cases}$$

For a given picture k in a GOP, knowing the desired buffer fullness at the end of a GOP, $bf'_{i_1-1}$, the desired buffer fullness after encoding picture k can be calculated, if the target number of bits for the picture and the actual encoded bits for the picture were identical. Working backwards from the end of the GOP to picture k with the following recursion:

$$bf'_{j-1} = bf'_j - (t_j + u_j) + \text{picture\_bits}_j, j = i_1 - 1, i - 2, \ldots, k+1,$$

where $t_j$ is the target number of bits for picture j. If $c_j$ is available in the look ahead buffer then we use it in calculating the target bits, otherwise we assume equal distribution of target bits for a given picture type. Thus $$t_j = \begin{cases} \sum_{k=0}^{M-1} w_{\tau_j}^{(k)} \cdot c_j^{(k)} \cdot \text{lookahead\_bits}^{(k)}/C^{(k)}, & \text{if } c_j^{(k)} \text{ is available} \\ \sum_{k=0}^{M-1} w_{\tau_j}^{(k)} \cdot \overline{c}_{\tau_j}^{(k)} \cdot \text{lookahead\_bits}^{(k)}/C^{(k)} & \text{otherwise.} \end{cases}$$

Not considering buffer fullness, the target picture bits for the macroblocks in activity class k for picture n is $$t_n^{(k)} = w_{\tau_n}^{(k)} \cdot c_n^{(k)} \cdot \text{lookahead\_bits}^{(k)}/C^{(k)}$$

and the target picture bits for the entirety of picture n (less the header bits $u_n$) is $$t_n = \sum_{k=0}^{M-1} t_n^{(k)}.$$

It is desired that after encoding picture n, the buffer fullness will be the desired buffer fullness from the above recursion, so that ideally, $$bf_n + t_n + u_n \text{picture\_bits}_n = bf'_n.$$

Because the above equation is not likely to hold true, the target bits are proportionally adjusted by how far off they are from the desired buffer fullness by the factor $$F = \frac{(V - bf_n - t_n - u_n + \text{picture\_bits}_n)^2}{(V - bf'_n)^2}.$$

The adjusted target picture bits per activity class from which the desired quantizer $q_n^{(k)}$ is calculated for activity class k in picture n is then $\text{target\_bits}_n^{(k)} = F \cdot t_n^{(k)}$ from which an initial estimate of the quantizer can be derived for activity class k in picture n, $$\hat{q}_n^{(k)} = \lambda \cdot \log_2 \frac{2^{q1/\lambda} \cdot c_n^{(k)}}{\text{target\_bits}_n^{(k)}}.$$

The estimated number of encoded bits per activity class for this quantizer is then $$\hat{e}_n^{(k)} = c_n^{(k)} \cdot 2^{(q1 - \hat{q}_n^{(k)})/\lambda}.$$

The actual number of encoded bits is denoted by $\alpha_n^{(k)}$. It is not uncommon to find that the estimate is too large by a factor of 2 to 8; this means that the estimated quantizer is too conservative and the actual quantizer should be lower. On the other hand, it is also possible that the estimate could be too small compared to the actual; this situation might prove dangerous because the actual is now larger than the target which could cause the encoder buffer to overflow. These large errors, in the ratios (or differences) between actual bits and estimated bits, mean that for some scenes, the model, of an approximate 12% increase (or decrease) in bits by lowering (or increasing) the quantizer by one, fails significantly. This becomes more likely the further the initial estimated quantizer is from $q_1$.

To accommodate these failures of the model, a multiplier (to the target bits) is used to adjust for the failure of $\hat{e}_n^{(k)}$ to accurately predict the number of bits actually generated. This multiplier is scene-based (as well as activity-based) and does not change significantly within a scene. There is a different multiplier for each activity class within a scene. Rather than calculating an "instantaneous" multiplier, $\hat{e}_n^{(k)}/\alpha_n^{(k)}$, a simple filter over the estimated bits and the actual bits in each activity class within a given scene is performed. There are different filtered values for each picture type. For picture n and activity class k, the filtered estimated bits are denoted by $\tilde{e}_{j,n}^{(k)}$ and the filtered actual bits are denoted by $\tilde{\alpha}_{j,n}^{(k)}$, where j=I, Ip, P, B-ref, or B. The estimated multiplier for picture n and activity class k is denoted by $\hat{m}_n^{(k)}$. At the first picture, n, of a scene, $\hat{m}_n^{(k)} = 1$. Within a scene, if $\tau_n \neq j$, then $$\tilde{e}_{j,n}^{(k)} = \tilde{e}_{j,n-1}^{(k)} \text{ and } \tilde{\alpha}_{j,n}^{(k)} = \tilde{\alpha}_{j,n-1}^{(k)},$$

and if $\tau_n = j$ then $$\tilde{e}_{j,n}^{(k)} = \begin{cases} \hat{e}_n^{(k)}, \\ \frac{3 \cdot \tilde{e}_{j,n-1}^{(k)} + \hat{e}_n^{(k)}}{4}, \end{cases}$$

at, the first picture of type j in the scene otherwise.

$$\tilde{\alpha}_{j,n}^{(k)} = \begin{cases} a_n^{(k)}, \\ \frac{3 \cdot \tilde{\alpha}_{j,n-1}^{(k)} + \alpha_n^{(k)}}{4}, \end{cases}$$

at the first picture of type j in the scene otherwise.

The estimated multipliers for pictures within a scene are calculated by dividing the weighted filtered estimated bits by the weighted filtered actual bits:

$$\hat{m}_{n+1}^{(k)} = \text{Clip3}\left(\frac{1}{2}, 10, \frac{n_I \cdot \tilde{e}_{I,n}^{(k)} + n_{Ip} \cdot \tilde{e}_{Ip,n}^{(k)} + n_P \cdot \tilde{e}_{P,n}^{(k)} + n_{B-ref} \cdot \tilde{e}_{B-ref,n}^{(k)} + n_B \cdot \tilde{e}_{B,n}^{(k)}}{n_I \cdot \tilde{\alpha}_{I,n}^{(k)} + n_{Ip} \cdot \tilde{\alpha}_{Ip,n}^{(k)} + n_P \cdot \tilde{\alpha}_{P,n}^{(k)} + n_{B-ref} \cdot \tilde{\alpha}_{B-ref,n}^{(k)} + n_B \cdot \tilde{\alpha}_{B,n}^{(k)}}\right).$$

The estimated multiplier $\hat{m}_n^{(k)}$ for the current picture is dependent on the estimated quantizer $\hat{q}_{n-1}^{(k)}$ used for the most recent picture. The multiplier that will actually be used in the calculation for picture n is denoted by $m_n^{(k)}$. If $\hat{q}_n^{(k)} = q_1$ then clearly $m_n^{(k)} = 1$ because the predicted actual bits should be very accurate since the target bits are very close to the first pass bits. If $\hat{q}_n^{(k)} = \hat{q}_{n-1}^{(k)}$ then $m_n^{(k)}$ should be close to $\hat{m}_n^{(k)}$ because that was close to what was used in the previous coded picture. If $\hat{q}_n^{(k)} \leq q_1$ and $\hat{q}_{n-1}^{(k)} \geq q_1$ or if $\hat{q}_n^{(k)} \geq q_1$ and $q_{n-1}^{(k)} \leq q_1$ then $m_n^{(k)} = 1$. In the other possibilities some interpolation/ extrapolation needs to be performed.

There are four cases:

(1) $q_1 < \hat{q}_{n-1}^{(k)} < \hat{q}_n^{(k)}$. This is an extrapolation case and a setting $m_n^{(k)} = \hat{m}_n^{(k)}$ is used.

(2) $q_1 < \hat{q}_n^{(k)} \leq \hat{q}_{n-1}^{(k)}$. This is interpolated so that $$m_n^{(k)} = \frac{\hat{q}_{n-1}^{(k)} - \hat{q}_n^{(k)} + \hat{m}_n^{(k)} \cdot (\hat{q}_n^{(k)} - q_1)}{\hat{q}_{n-1}^{(k)} - q_1}.$$

(3) $q_1 > \hat{q}_{n-1}^{(k)} > \hat{q}_n^{(k)}$. This also is an extrapolation case and $m_n^{(k)} = \hat{m}_n^{(k)}$ is set.

(4) $q_1 > \hat{q}_n^{(k)} \geq \hat{q}_{n-1}^{(k)}$. This is interpolated so that $$m_n^{(k)} = \frac{\hat{q}_n^{(k)} - \hat{q}_{n-1}^{(k)} + \hat{m}_n^{(k)} \cdot (q_1 - \hat{q}_n^{(k)})}{q_1 - \hat{q}_{n-1}^{(k)}}.$$

The k quantizers that are actually used for coding picture n are then $$q_n^{(k)} = \text{Clip3}\left(q_{min}, 51, \lambda \cdot \log_2 \frac{2^{q_1/\lambda} \cdot c_n^{(k)}}{m_n^{(k)} \cdot \text{target\_bits}_n^{(k)}}\right),$$

where $q_1$ is the constant quantizer used in the first pass. In the current implementation, the minimum quant, $q_{min}$, has the value of 10. Quantizers are further constrained such that within a GOP, if picture type $\tau_n = P$ or $\tau_n = Ip$, then $\forall k: 0 \leq k < M$, $q_n^{(k)} \geq q_{i_0}^{(k)} \geq q_{i_0}^{(k)}$ (where by definition $\tau_{i_0} = I$); furthermore, if $\tau_{i_0+1} = Ip$ and if picture type $\tau_n = P$, then $\forall k: 0 \leq k < M$, $q_n^{(k)} \geq q_{i_0}^{(k)}$. Subsequent P pictures with a GOP are further constrained such that if picture m is a prior P picture to the current P picture n, then $q_n^{(k)} = \max(q_n^{(k)}, q_m^{(k)} - \Delta^{(k)})$ where $\Delta^{(k)}$ is dependent on $w_I^{(k)}$. In other words, there is a floor to the lowest P quantizer and the subsequent P quantizers are prevented from dropping too quickly, if at all (for still content). The offset $\Delta^{(k)}$ is defined $$\text{by } \Delta^{(k)} = \begin{cases} w_I^{(k)} > 80 \to 0 \\ 80 \geq w_I^{(k)} > 2 \to 1 \\ 2 \geq w_I^{(k)} > 1 \to 5 - 4 \cdot (w_I^{(k)} - 1) \\ 1 \geq w_I^{(k)} \to 5. \end{cases}$$

For any pictures m and n within the same sub-GOP, if $\tau_m = $ B-ref and $\tau_n = P$, or if $\tau_m = B$ and $\tau_n = $ B-ref then $\forall k: 0 \leq k < M$, $q_m^{(k)} \geq q_n^{(k)}$.

On difficult content, at low bit rates, it may turn out that even using the maximum quantizer value of 51 is insufficient to preclude the encoder from over-running its buffer. To forestall such a possibility, frame rate reduction is utilized by first calculating the estimated bits for picture n, est_bits$_n$, based on the $q_n^{(k)}$ derived above as $$\text{est\_bits}_n = \sum_{k=0}^{M-1} c_n^{(k)} \cdot 2^{(q_1/\lambda - q_n^{(k)}/\lambda)}.$$

Then the estimated buffer fullness after encoding picture n, denoted by est_bf$_n$, is calculated as $$\text{est\_bf}_n = bf_n + \text{est\_bits}_n + u_n - \text{picture\_bits}_n.$$

When the quantizer for the highest activity class, $q_n^{(M-1)}$, calculates to a value greater than 51 before clipping in the above equation for $q_n^{(k)}$ and when est_bf$_n >$ bf$'_n$ and if est_bf$_n > 0.9 \cdot V$ then we will code picture n as a skip picture under either of the following conditions:

(1) if est_bf$_n$ − bf$'_n > 0.2 \cdot V$ and if picture n is a second field or if $\tau_n = B$ or $\tau_n = $ B-ref, or (2) if est_bf$_n$ − bf$'_n > 0.05 \cdot V$ and if $\tau_n = B$.

If the picture coded as a skip picture from the above frame rate reduction process is a P picture type, then all subsequent B-reference pictures and B pictures that reference the P picture are also encoded as a skip picture. If the picture coded as a skip picture from the above frame rate reduction process is a B-reference picture type, then all subsequent B pictures that reference the B-reference picture are also encoded as a skip picture. This will prevent buffer overflow and will prevent jitter when the decoded video is played.

The devices, units, modules, and storage discussed above can physically be provided on a circuit board or within an electronic device and can include various processors, microprocessors, controllers, chips, disk drives, and the like. It will be apparent to one of ordinary skill in the art that the modules, processors, controllers, units, and the like may be implemented as electronic components, software, hardware or a combination of hardware and software.

While the principles of the invention have been described above in connection with specific devices, systems, and methods, it is to be clearly understood that this description is made only by way of example and not as limitation on the scope of the invention as defined in the appended claims.

We claim:

1. A method of dual-pass rate control video encoding, comprising:
   receiving uncompressed input video including a sequence of pictures with a video encoder, the input video including a plurality of contiguous sequences of pictures each referenced to as a Group of Pictures (GOP) that, when coded, begin with an I-picture in display order and end with a last picture before a next I-picture;
   performing a first encoding pass of the uncompressed video with the video encoder; and
   performing a second encoding pass for rate control of the uncompressed video with the video encoder at a delay relative to the first encoding pass;
   during the first encoding pass:
     detecting scene changes within the input video,
     assigning macroblocks to a pre-determined number of activity classes,
     determining a complexity of each picture within the sequence of pictures, and
     generating an average macroblock activity per activity class for use during the second encoding pass,
     the macroblocks each being a rectangular array of luma samples and two corresponding blocks of chroma samples in the pictures, the activity classes each being a defined class of macroblocks based on luma values of the pictures of the input video, and the complexity being a number of bits generated per picture and activity class;
   during the second encoding pass:
     using information from the first encoding pass concerning the scene changes, the activity classes, the complexity, and the average macroblock activity per activity class to produce the rate control, and
     producing a bit stream of compressed video; and during at least one of the first encoding pass and the second encoding pass, one or more boundaries of at least some of the GOPs are adjusted to be aligned with the scene changes.

2. The method according to claim 1, wherein, during the first encoding pass, macroblock activity values are calculated for each picture and activity class and are equal to a sum of luma values of macroblocks within a picture and a given activity class divided by a total number of macroblocks within the picture and the given activity class, and wherein said detecting scene changes is based on a comparison of an average of the macroblock activity values of a set of prior pictures relative to an average of the macroblock activity values of a next set of pictures in display order.

3. The method according to claim 2, wherein the first encoding pass generates the following data for use during the second encoding pass:
picture type, scene change flag, header bits, generated bits per activity class, and number of macroblocks per activity class.

4. The method according to claim 1, wherein quantizers for rate control are determined by the second encoding pass for each macroblock on a per picture type and activity class basis, wherein an average complexity for a given picture type and activity class is determined for each of the GOPs, and wherein ratios between the average complexities of GOPs are used to determine bit allocation and quantizer selection for rate control during the second encoding pass.

5. The method according to claim 1, wherein, during the first encoding pass, every picture of a given picture type is encoded with a constant quantizer (QP) for all macroblocks of the given picture type and wherein the complexity for each picture is stored in a sliding window look-ahead buffer used during said performing the second encoding pass.

6. The method according to claim 1, wherein each GOP includes a plurality of sub-GOPs, each sub-GOP being a contiguous sequence of coded pictures that begin, in display order, with an I-picture or a P-picture and ends with a last picture before a next I-picture or P-picture; and wherein, during the first encoding pass, a first picture at which a new scene starts and each sub-GOP containing a first picture of a new scene are identified.

7. The method according to claim 6, wherein said performing the first encoding pass includes promoting a P-picture to an I-picture for every sub-GOP containing the first picture of a new scene.

8. The method according to claim 1, wherein the video encoder is selected from a group selected from a constant bit rate (CBR) encoder and a statistical multiplexer (stat-mux) encoder.

9. The method according to claim 1, wherein a target encoder buffer fullness is calculated during the second encoding pass at the beginning of each GOP and at every intermediate picture within a GOP.

10. The method according to claim 1, wherein during the second encoding pass, a size of encoded bits generated for a picture at a given quantizer (QP) and of a given activity class is predicted by applying a content-dependent multiplication factor derived from a set of estimation filters.

11. The method according to claim 1, wherein if, after encoding by the second encoding pass, the bits for a given picture would cause an encoder buffer to overflow, encoded pictures of minimal known size are substituted in the encoder buffer before outputting of the bit stream of compressed video from the video encoder.

12. A method of dual-pass rate control video encoding, comprising:
receiving uncompressed input video including a sequence of pictures with a video encoder, the input video including a plurality of contiguous sequences of pictures each referenced to as a Group of Pictures (GOP) that, when coded, begin with an I-picture in display order and end with a last picture before a next I-picture;
performing a first encoding pass of the uncompressed video with the video encoder; and
performing a second encoding pass for rate control of the uncompressed video with the video encoder at a delay relative to the first encoding pass;
during the first encoding pass:
detecting scene changes within the input video,
assigning macroblocks to a pre-determined number of activity classes,
determining a complexity of each picture within the sequence of pictures, and
generating a number of macroblock per activity class for use during the second encoding pass,
the macroblocks each being a rectangular array of luma samples and two corresponding blocks of chroma samples in the pictures, the activity classes each being a defined class of macroblocks based on luma values of the pictures of the input video, and the complexity being a number of bits generated per picture and activity class;
during the second encoding pass:
using information from the first encoding pass concerning the scene changes, the activity classes, the complexity, and the average macroblock activity per activity class to produce the rate control, and
producing a bit stream of compressed video; and
during at least one of the first encoding pass and the second encoding pass, one or more boundaries of at least some of the GOPs are adjusted to be aligned with the scene changes.

13. The method according to claim 12, wherein, during the first encoding pass, macroblock activity values are calculated for each picture and activity class and are equal to a sum of luma values of macroblocks within a picture and a given activity class divided by a total number of macroblocks within the picture and the given activity class, and wherein said detecting scene changes is based on a comparison of an average of the macroblock activity values of a set of prior pictures relative to an average of the macroblock activity values of a next set of pictures in display order.

14. The method according to claim 13, wherein the first encoding pass generates the following data for use during the second encoding pass:
picture type, scene change flag, header bits, generated bits per activity class, and an average macroblock activity per activity class.

15. The method according to claim 12, wherein quantizers for rate control are determined by the second encoding pass for each macroblock on a per picture type and activity class basis, wherein an average complexity for a given picture type and activity class is determined for each of the GOPs, and wherein ratios between the average complexities of GOPs are used to determine bit allocation and quantizer selection for rate control during the second encoding pass.

16. The method according to claim 12, wherein, during the first encoding pass, every picture of a given picture type is encoded with a constant quantizer (QP) for all macroblocks of the given picture type and wherein the complexity for each picture is stored in a sliding window look-ahead buffer used during said performing the second encoding pass.

17. The method according to claim 12, wherein each GOP includes a plurality of sub-GOPs, each sub-GOP being a contiguous sequence of coded pictures that begin, in display order, with an I-picture or a P-picture and ends with a last picture before a next I-picture or P-picture; and wherein, during the first encoding pass, a first picture at which a new scene starts and each sub-GOP containing a first picture of a new scene are identified.

18. The method according to claim 17, wherein said performing the first encoding pass includes promoting a P-picture to an I-picture for every sub-GOP containing the first picture of a new scene.

19. The method according to claim 12, wherein the video encoder is selected from a group selected from a constant bit rate (CBR) encoder and a statistical multiplexer (stat-mux) encoder.

20. The method according to claim 12, wherein a target encoder buffer fullness is calculated during the second encoding pass at the beginning of each GOP and at every intermediate picture within a GOP.

21. The method according to claim 12, wherein during the second encoding pass, a size of encoded bits generated for a picture at a given quantizer (QP) and of a given activity class is predicted by applying a content-dependent multiplication factor derived from a set of estimation filters.

* * * * *